Nov. 8, 1932.  K. W. GRAYBILL  1,887,302
RELAY CIRCUIT
Original Filed Sept. 5, 1929
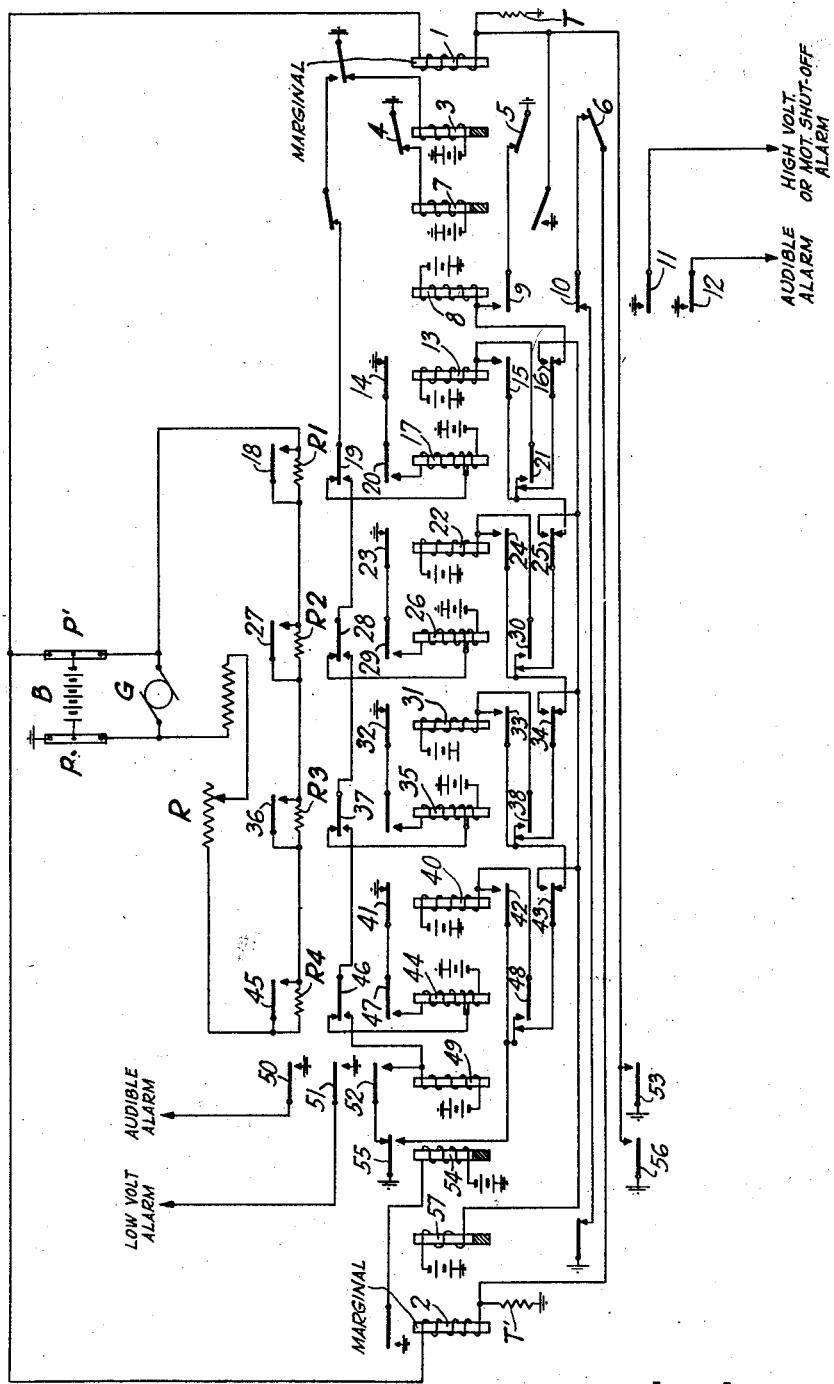
Inventor
Kenneth W. Graybill
Atty.

Patented Nov. 8, 1932

1,887,302

UNITED STATES PATENT OFFICE

KENNETH W. GRAYBILL, OF VILLA PARK, ILLINOIS, ASSIGNOR, BY MESNE ASSIGNMENTS, TO ASSOCIATED ELECTRIC LABORATORIES, INC., OF CHICAGO, ILLINOIS, A CORPORATION OF DELAWARE

RELAY CIRCUIT

Original application filed September 5, 1929, Serial No. 390,474, now Patent No. 1,805,140, dated May 12, 1931. Divided and this application filed October 27, 1930. Serial No. 491,354.

This invention relates to relay circuits in general, but more particularly to the arrangement of relays and circuits therefor into what are commonly known as counting relay arrangements.

It is the principal object of this invention to provide a system of counting relays which is particularly adaptable for use in a voltage regulating system such as that disclosed in Letters Patent 1,805,140, issued May 12, 1931, of which patent this application is a division.

Other objects and features not specifically mentioned will be apparent from the following detailed description of the invention in connection with said voltage regulating system when that description is studied in conjunction with the accompanying single sheet of drawing.

In the drawing, the storage battery which is to have its voltage maintained within certain limits is indicated at B, while the generator to charge the battery B is indicated at G. The generator is of the shunt wound type having the field rheostat R. In series with the field winding and the field rheostat R are the resistance elements R1 to R4, inclusive. These resistance elements are of a small value, that value and the number of the resistances employed depending upon the range of the limits and the range in load variations.

The relays and circuits therefor which control the inclusion and exclusion of the resistance elements R1 to R4, inclusive, in the generator field are diagrammatically represented below the generator G and resistance elements R1 to R4. The relay 1 at the right side of the drawing is the low voltage, marginally adjusted relay, being bridged across the terminals of the battery B at all times and so adjusted that the relay will operate and remain in its operated position when the voltage increases to and remains above the low voltage limit. Hereinafter, relay 1 will be referred to as the "low relay."

At the left side of the drawing is the relay 2 which is the high voltage, marginally adjusted relay, being so adjusted that it will not operate until the voltage of the battery reaches the high limit. This relay also is normally bridged across the terminals of the battery B. Hereinafter, relay 2 will be termed the "high relay."

The generator brush leads are shown connected to the bus bars P and P'. The positive pole of battery B is connected to bus bar P and the negative pole thereof to bus bar P'. As the generator is continuously running at a substantially constant speed, the battery is floated across the charging leads. The P bus bar is shown connected to ground.

Throughout the drawing there are shown several battery and ground connections. It is to be understood, however, that there is only one battery in the system, the ground symbols representing connections to the positive bus bar P, and the battery symbols representing connections to the negative bus bar P'.

For the sake of illustration, it will be assumed that the voltage limits of battery B are $46\frac{1}{4}$ volts and $46\frac{3}{4}$ volts. The adjustment of the low relay 1 is such that when the voltage of the battery B falls below $46\frac{1}{4}$ volts, the relay will deenergize. The adjustment of the high relay 2 is such that it does not energize sufficiently to attract its armatures until the voltage increases to $46\frac{3}{4}$ volts.

When the equipment is at normal, which condition occurs when the voltage of battery B is within the required limits, the low relay is in its operated position. This results in slow-to-release relays 3 and 7 being in their operated positions as is evident from the drawing. It will be noted that the normal circuit of the low relay 1 includes the resistance element T. Relay 1 without the resistance T in series therewith will operate on a lower voltage than $46\frac{1}{4}$ volts.

Relay 3, at its armature 5, maintains a locking circuit prepared for relay 8, and at its armature 6, completes a circuit for high relay 2 independent of resistance element T'. Relay 2 with resistance T' in series therewith requires a much higher voltage than $46\frac{3}{4}$ to cause it to operate and to maintain it operated.

Relay 7, at its upper armature, maintains a circuit prepared for relay 17, and at its lower armature maintains open the circuit of low relay 1 which does not include the resistance T.

The equipment remains in this condition until such time as the voltage varies from within the high and low voltage limits.

It will first be assumed that the load upon the battery B increases to such an extent that the voltage drops below the low limit of 46¼ volts. When this condition occurs, the low relay 1 will not receive sufficient current to keep its armature attracted. The armature, in retracting, opens the circuit of relay 3 and completes the circuit for the lower winding of relay 17 via the upper armature of relay 7 and armature 19 and its resting contact of relay 17. Relay 17 is a two-step relay and its lower winding is strong enough to only attract its armature 20 to complete a circuit for its two windings in series. However, as long as ground remains connected to armature 19, the upper winding of relay 17 is short circuited.

Relay 3 deenergizes a short interval after relay 1 opens its circuit and opens the circuits of relays 7 and 2. The circuit of relay 2, that is the circuit of relay 2 which is independent of the resistance T', is opened to insure that relay 2 can under no condition operate as long as the relay 1 is operating to increase the battery voltage.

Relay 7 also deenergizes after an interval and at its upper armature removes the short circuit about the upper winding of relay 17. Thereupon, both windings of relay 17 energize in series and attract armatures 18, 19, and 21, also.

At armature 18 relay 17 places a shunt about the resistance element R1, thereby reducing the field resistance of the generator to increase the current output, or charging rate, of the generator G.

At armature 19 and its alternate contact, relay 17 prepares a circuit for the lower winding of two-step relay 26, which circuit will be completed upon a subsequent deenergization of low relay 1.

At armature 21 and its make-before-break contacts, relay 17 prepares a circuit for relay 13.

When relay 7 deenergized responsive to the deenergization of relay 3, at its lower armature, it completed a circuit for low relay 1, which circuit excludes the resistance element T. Relay 1, therefore, energizes and completes the circuit of relay 3, which in turn energizes and again operates relay 7. Relay 7, in operating, opens the just-described energizing circuit of relay 1 and leaves the circuit of relay 1 including resistance element T. In the meantime, the charging rate of the generator G has been increased and the rise in voltage of the battery has commenced. If the increase is enough to return the voltage to within the limits, relay 1 will remain energized when the short circuit of resistance element T is removed.

However, if the voltage increase is not sufficient to maintain the low relay 1 energized when the short circuit is removed from resistance element T, relay 1 will again deenergize, this time completing the circuit for the lower winding of two-step relay 26. Relay 26 operates fully when the short circuit of its upper winding is removed by the deenergization of relay 7 and functions as did relay 17 to further decrease the field resistance by placing a shunt about the associated resistance element R2, thereby increasing the generator charging rate an additional amount, and to prepare the circuit for the lower winding of the next two-step relay 36 and prepare the circuit of relay 22.

Relay 1 is again operated by the deenergization of relay 7. This operation again causes the operation of relays 3 and 7 and the subsequent removal of the short circuit about resistance element T.

If, by the exclusion of the resistance element R2 from the generator field, the battery voltage has been increased sufficiently to maintain low relay 1 energized when its only circuit includes the element T, nothing further will happen until another change occurs. But, if the battery voltage has not been increased sufficiently to so maintain relay 1, the same cycle of operations will occur and relay 35 will be operated to further increase the generator output by placing a shunt about the associated resistance element R3.

If a still further increase of the charging rate is necessary to return the voltage of the battery B to within the limits, the same cycle of operations will be performed and two-step relay 44 will be operated to still further increase the charging rate by placing a shunt about the associated resistance element R4.

Under ordinary operating conditions, it is unlikely that all of the resistance elements R1 to R4 will be excluded from the field; but, as unusual conditions inevitably arise at one time or another, it is well to provide enough such resistance elements as will suffice for such an emergency.

If there should be trouble, such as a generator failure or a short circuit of the battery, or any other serious trouble which would cause the voltage of the battery to continually drop, the operation of the low relay 1 after the last of the two-step relays, in this case 44, has been operated, completes a circuit for the low voltage alarm relay 49 which operates and, at its armature 52, locks itself to ground through resting contact and armature 55 of relay 54, at armatures 50 and 51 completes circuits for an audible alarm and a low voltage alarm to call the attendant's attention to the trouble and advise him of the nature thereof, and at armature 53 completes a circuit for low relay 1 by short circuiting the element T to prevent further periodic operations of relay 1.

To complete the description of the operation of the system, it will be assumed that when relay 44 operated to place a shunt about resistance element R4, the voltage increase was sufficient to return the battery voltage within the specified limits. It will further be assumed that after a time the battery voltage has increased to such an extent that it rises above the high limit of 46¾ volts.

When that occurs, high relay 2 energizes sufficiently to attract its armature, thereby completing the circuit of slow-to-release relay 54, which relay energizes and attracts its armature 56 and its armature 55 into their alternate positions. In that position of armature 55, a circuit for relay 40 is completed by way of armature 48 and its make-before-break contact, since relay 44 is in its operated position. Relay 40 accordingly operates and at its armature 42 completes a locking circuit for itself which is independent of relay 44, at armature 41 opens the locking circuit of relay 44, and at armature 43 prepares a circuit for slow-to-release relay 57. The attraction of armature 56 short circuits resistance T to insure that relay 1 will not deenergize with any momentary fluctuations of the battery voltage.

Relay 44 deenergizes when its locking circuit is opened and retracts its armatures. The retraction of armature 45 removes the shunt from around resistance element R4, thereby increasing the generator field resistance to decrease the charging rate. The retraction of armature 48 transfers the ground at armature 55 from the original circuit of relay 40 to relay 57 via armature 43 and its alternate contact. This energizes relay 57 which attracts its armature to remove the short circuit from about resistance element T'. With element T' in series with its winding, relay 2 does not receive enough current to maintain its armature attracted, so the armature retracts and opens the circuit of relay 54.

After an interval relay 54 deenergizes and retracts its armature 55 to open the locking circuit of relay 40 and the circuit of relay 57. Relays 40 and 57 release relay 40 immediately and relay 57 after an interval. Relay 57 in releasing again completes a circuit for high relay 2 via armature 10 of relay 8 and armature 6 of relay 3, which circuit short circuits resistance element T'.

When T' is short circuited, high relay 2 will remain inert if the voltage of the battery has receded to within the limits. If the voltage is still above the high limit, relay 2 will again operate to complete the circuit of relay 54. The operation of relay 54 this time operates relay 31 since relays 44 and 40 have been released.

Relay 31 locks itself and unlocks relay 35 which deenergizes to remove the shunt from ground resistance element R3 to further increase the generator field to further decrease the charging rate. The release of relay 35 completes the circuit of relay 37 when it retracts its armature 38 since armature 34 of relay 31 is in its attracted position. Relay 57 opens the circuit of relay 2 which does not include the resistance T' and relay 2 deenergizes as before to release relay 54 which in turn releases relay 31 which in its turn releases relay 57. Relay 57 again short circuits resistance T'.

If relay 2 again operates, which operation indicates that the battery voltage has not decreased sufficiently, the same cycle of operations will again take place, the cycle this time including relays 22 and 26 which function the same as relays 31-35 and 40-44. This time the short circuit is removed from about resistance element R2 and the field resistance and generator charging rate are varied accordingly.

Another operation of high relay 2 will include relays 13 and 17 in the cycle and resistance element R1 will be included in the generator field to cause still another decrease in the charging rate.

If for some reason the voltage of the battery still remains above the high limit after all of the resistance elements R1 to R4, inclusive, have been included in the generator field, the next operation of relay 2 after resistance T' has been short circuited will complete the circuit of relay 8 to those completed for relays 40, 31, 22, and 13. Relay 8 will operate and lock itself at its armature 9, at armature 10 removes the short circuit about resistance T' to prevent further operations of relay 2, and at armatures 11 and 12 completes circuits for the audible alarm and a high voltage alarm or motor shut-off alarm.

From the foregoing, it can be seen that as long as the battery voltage remains within the specified limits that the low relay 1 and the high relay 2 are inactive and are performing a "continuous" test of the battery voltage. As soon as the voltage varies from within the limits, one or the other of the relays 1 and 2 becoming active perform periodic tests of the battery voltage until the voltage returns to normal.

Having thus described my invention, what I consider new and desire to have protected by Letters Patent is pointed out in the appended claims.

What is claimed is:

1. In a relay system, a plurality of pairs of relays, a chain circuit for the first relays of said pairs, a locking circuit individual to each first relay, means for intermittently closing said chain circuit, each of said first relays energizing responsive to a closure of said chain circuit and having means operated thereby to complete its individual locking circuit and to extend said chain circuit to the next first relay, a chain circuit for the second relays of said pairs, means for intermittently closing said second chain circuit, each of said second relays energizing responsive to a closure of said second chain circuit and having means operated thereupon to open the locking circuit of the associated first relay of the pair to release that relay, and means operated by the release of each first relay to extend said second chain circuit to the next of said second relays.

2. In a relay system, a plurality of pairs of relays, a chain circuit for the first relays of said pairs, a locking circuit individual to each first relay, means for momentarily closing said chain circuit, each of said first relays energizing responsive to a closure of said chain circuit and having means operated thereby to complete its individual locking circuit and to extend said chain circuit to the next of the first relays, whereby said first relays are energized in a definite progression and maintained energized independently of each other, a chain circuit for the second relays of said pairs, means for momentarily closing said second chain circuit, each of said second relays momentarily energizing responsive to a momentary closure of said second chain circuit and having means operated thereby to open the locking circuit individual to the associated first relay of the pair to release that relay, and means operated by the release of each pair of relays to extend said second chain circuit to the next of said second relays, whereby said second relays are energized in a definite progression to release the energized first relays in a progression reverse to that in which they were energized.

3. In a relay system, a first master relay, a second master relay, means for momentarily operating each master relay and preventing the operation of the other while one master relay is operating, a plurality of pairs of relays, a chain circuit for the first relays of said pairs, a locking circuit individual to each first relay, means operated by each momentary operation of said first master relay to momentarily close said chain circuit, each first relay energizing responsive to a momentary closure of said chain circuit and having means operated thereby to close its individual locking circuit and to extend said chain circuit to the next of said first relays, whereby said first relays are energized one for each momentary operation of said first master relay and in a definite progression, a chain circuit for the second relays of said pairs, means operated by each momentary operation of said second master relay to momentarily close said second chain circuit, each of said second relays momentarily energizing responsive to a momentary closure of said second chain circuit and having means operated thereby to open the locking circuit individual to the associated first relay of the pair to restore that relay, and means operated by the restoration of each pair of relays to extend said second chain circuit to the next of said second relays, whereby said second relays are energized in a definite progression, each momentarily, to restore said first relays in a progression reverse to that in which they were energized.

4. In a relay system, a plurality of pairs of relays, a chain circuit for the first relays of said pairs, a locking circuit individual to each first relay, means for momentarily closing said chain circuit a variable number of times, each first relay energizing responsive to a closure of said chain circuit and having means operated thereby to close its individual locking circuit and to extend said chain circuit to the next of said first relays, whereby said relays are energized in a definite progression and in numbers corresponding to the number of momentary closures of said chain circuit, a chain circuit for the second relays of said pairs, means for momentarily closing said second chain circuit a variable number of times, each second relay momentarily energizing responsive to a closure of said second chain circuit and having means operated thereby to open the locking circuit individual to the associated first relay of the pair to release that relay, and means associated with each first relay and operated by the energization of its associated first relay to extend said second chain circuit to the second relay of that pair and again operated by the release of its associated first relay to extend said second chain circuit to the next of said second relays, whereby the first second relay to be energized is that associated with the last of said first relays energized and whereby said first relays are released in a progression reverse to that in which they were energized.

In witness whereof, I hereunto subscribe my name this 23d day of October, A. D. 1930.

KENNETH W. GRAYBILL.